W. E. BLAIR.
PACKING RING.
APPLICATION FILED JUNE 14, 1919.
1,361,672.
Patented Dec. 7, 1920.
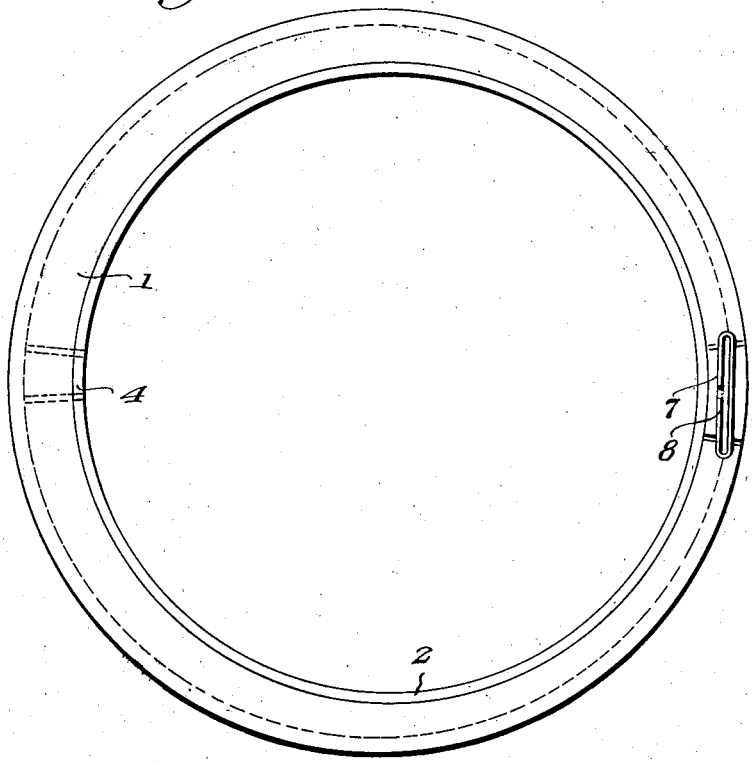
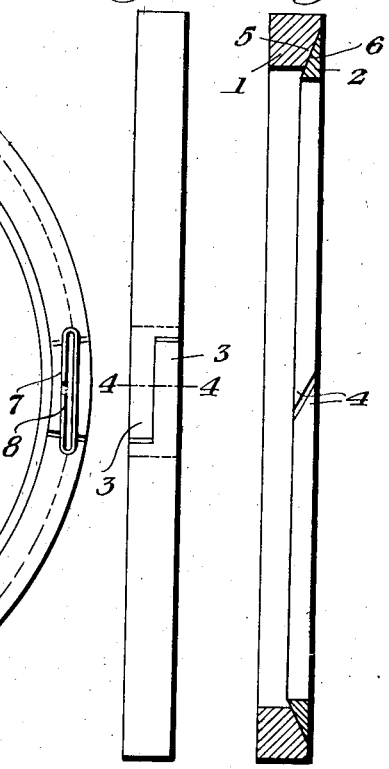
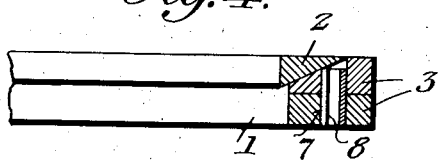
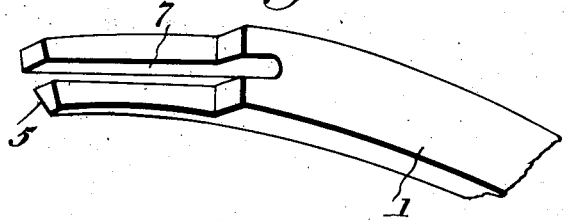
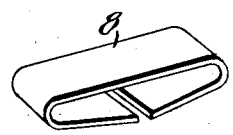
Witnesses
E. O. Buchanan.
Inventor
William E. Blair
By Victor J. Evans
Attorney

UNITED STATES PATENT OFFICE.

WILLIAM E. BLAIR, OF SAGINAW, MICHIGAN.

PACKING-RING.

1,361,672.　　　　　Specification of Letters Patent.　　Patented Dec. 7, 1920.

Application filed June 14, 1919. Serial No. 304,196.

*To all whom it may concern:*

Be it known that I, WILLIAM E. BLAIR, a citizen of the United States, residing at Saginaw, in the county of Saginaw and State of Michigan, have invented new and useful Improvements in Packing-Rings, of which the following is a specification.

This invention relates to packing rings particularly designed for use in connection with the pistons of an internal combustion engine, although it will be obvious as the description proceeds that the said ring is applicable to many other forms of piston or similar construction where metallic packing is desired. As is well known to those familiar with explosive and expansion engines or air compressors where a metallic packing ring is required, the piston is circumferentially grooved at one or more points and a split packing ring is fitted with ample working clearance in said groove with its ends sufficiently separated to permit expansion of the ring when heated. As the piston moves back and forth, the ring or rings take up a whirling movement on the piston, said whirling motion causing the sides of the rings and the side walls of the groove to wear considerably. This wearing of the walls of the groove and the side walls of the rings causes the rings to play sidewise in the groove and results in the knocking of the piston rings in the groove, said knocks resembling the loose bearing of the connecting rod in an engine. The opening or split at the ends of the ring however provides for a pass for the gases or fluid to pass from one side of the piston ring to the other thereby steadily increasing the wear and steadily increasing the leak or flow of liquid or fluid between the top side of the groove and ring and underneath the ring and out between the lower side face of the ring and the groove.

The fluid or gas leaking beneath the ring burns and forms carbon in the ring groove back of the ring which soon fills up the clearance space underneath the ring and causes the ring to stick in the groove. The leaking points of this type of ring materially lowers the efficiency of the engine and ultimately requires the repairing of the piston as is well known to those familiar with this art. Various means have been adopted and suggested for obviating the difficulty referred to, one of the most common expedients being the use of a plurality of rings or ring sections in which the division or splits are located as nearly as possible at opposite sides of the piston. While this remedies the trouble to a certain extent, it only increases the difficulty of stopping the gas or fluid from passing underneath the ring as the more parts used, the more side faces there are subjected to wear by the whirling of the ring in the groove. Such extra wear rapidly increases the side play of the ring in the groove. The above difficulties are found to be encountered unless the ring is constructed so as to automatically take up this side wear and prevent the ring from whirling around the piston. Furthermore, the gap or gaps between the ends of the ring or ring sections must be taken care of in order to stop leakage.

The object of my invention is to overcome the difficulties above referred to in a practical and reliable manner by compensating for wear and providing automatically for radial thrust of the ring so as to maintain contact between the outer periphery of the ring and the inner wall of the cylinder, and also lateral or side thrust so that the ring will at all times fit snugly within the groove in the piston.

While I have herein illustrated and described specifically the preferred form of the invention, I have done so for the purpose of identification only, for it will be apparent as the description proceeds that the invention may be embodied in other forms falling within the scope of the appended claim.

With the above and other objects in view the invention consists in the novel construction, combination and arrangement of parts herein fully described, illustrated and claimed.

In the accompanying drawings:

Figure 1 is a plan view of the improved piston ring.

Fig. 2 is a side or edge view of the same.

Fig. 3 is a diametrical section through the ring.

Fig. 4 is a section on the line 4—4 of Fig. 2.

Fig. 5 is a fragmentary perspective view of one end of the main section of the ring.

Fig. 6 is a detail view of the leak stop spring.

The improved piston ring in the illustrated and preferred embodiment of the invention is composed of a main radial thrust section 1 and a minor lateral or side thrust section 2, the last named section being of smaller external diameter than the main section 1 and both of said sections being substantially of the same internal diameter, although if desired the smaller section 2 may be slightly less in diameter than the main section 1 as shown for example in Fig. 3.

The main section 1 is transversely divided on a zig-zag line as shown in Fig. 2 to provide two overlapping tongues 3 forming a break joint to prevent excessive leakage of gas past the extremities of the ring. The main section 1 of the ring is adapted to expand radially so as to automatically maintain a tight contact with the inner wall of the cylinder in the usual way.

The smaller ring section 2 is likewise transversely divided or split to provide beveled extremities 4 which overlap and ride upon each other. The ring sections 1 and 2 are provided with beveled meeting faces 5 and 6 respectively which are adapted to ride upon each other, the smaller ring section 2 being adapted to expand and having a normal tendency to expand causing the beveled meeting face 6 thereof to ride outwardly and inwardly on the meeting face 5 of the main ring section 1. This causes the ring as a whole, composed of the sections 1 and 2, to expand laterally or sidewise and thereby snugly fit within the groove in the piston. As a result, the usual whirling motion of the ring is retarded or stopped thus preventing excessive rapid wearing away of the side walls or surfaces of the ring as a whole. Both ring sections 1 and 2 are of the eccentric type or in other words the inner and outer surfaces thereof are eccentric with relation to each other in order to cause equal expansion of both rings in a radial direction.

Both extremities of the main ring or ring section 1 are provided with open ended slots 7 as shown in the drawings, and best illustrated in Fig. 5 which shows one end of the ring and one of the slots 7 therein. Fitted in the slots 7 and extending across and bridging the gap or joint between the extremities of said ring section 1 is a C-shaped spring or baffle 8 shown in the detail view of Fig. 6, the end portions of the spring 8 normally flaring outwardly so that when the spring is placed in position in the slot 7, it will retain itself in its position therein by reason of its own inherent resiliency. The spring 8 serves as a stop to prevent leakage of fluid between the meeting faces of the overlapping tongues 3 of the main ring section 1.

The improved ring is assembled in the piston groove in much the same manner as the ordinary piston rings now in use. The side thrust ring 2 is first placed in position and then the main ring 1 after which the spring 8 is inserted in its place. It will be seen that with a ring constructed according to my invention, leakage directly past the opening in the ring is prevented thus making it impossible for fluid or gas or air to leak past the ring. By the reason of the simplicity of the construction and the nature of the few operations required to produce the ring, said ring may be made at low cost and is greatly superior to the ordinary ring as well as the so called leak proof ring in the economy of fuel and lubricating oil, producing higher compression and increased horse power and efficiency by eliminating side play of the ring within its groove and also eliminating the knocking caused by loose piston ring.

What is claimed is:—

A multiple part piston ring of the class described consisting of a main and secondary eccentric ring, the opposite sides of each ring being in beveled relation to each other, the main ring being split transversely and formed with slots in the extremities thereof and a C-shaped leak proof spring, resiliently held in said slots and bridging the space between the meeting extremities of said main section.

In testimony whereof I affix my signature.

WILLIAM E. BLAIR.